(12) United States Patent
Baxivanelis et al.

(10) Patent No.: US 7,197,826 B2
(45) Date of Patent: Apr. 3, 2007

(54) COMPASS SAW WITH A SUCTION CONNECTION ARRANGEMENT

(75) Inventors: Konstantin Baxivanelis, Kaufering (DE); Stefan Dorner, Kaufbeuren (DE); Michael Neumeier, Steingaden (DE)

(73) Assignee: Hilti Aktiengesellschaft, Schaan (LI)

( * ) Notice: Subject to any disclaimer, the term of this patent is extended or adjusted under 35 U.S.C. 154(b) by 36 days.

(21) Appl. No.: 11/006,309

(22) Filed: Dec. 7, 2004

(65) Prior Publication Data
US 2005/0126010 A1 Jun. 16, 2005

(30) Foreign Application Priority Data
Dec. 11, 2003 (DE) ................. 103 57 841

(51) Int. Cl.
*B27G 3/00* (2006.01)
(52) U.S. Cl. ......................................... 30/124; 30/392
(58) Field of Classification Search ................. 30/124, 30/374, 392
See application file for complete search history.

(56) References Cited

U.S. PATENT DOCUMENTS

| 4,090,297 | A | * | 5/1978 | Wanner et al. ................. 30/124 |
| 4,665,617 | A | * | 5/1987 | Maier et al. .................. 30/374 |
| 4,837,935 | A | * | 6/1989 | Maier et al. .................. 30/392 |
| 5,012,583 | A | * | 5/1991 | Blochle et al. ............... 30/392 |
| 5,778,538 | A | * | 7/1998 | Gentinetta et al. ............ 30/124 |
| 6,357,124 | B1 |   | 3/2002 | Wall et al. |
| 6,892,459 | B2 | * | 5/2005 | Okumura et al. .......... 30/123.3 |
| 6,912,788 | B2 | * | 7/2005 | Tam et al. .................... 30/124 |

OTHER PUBLICATIONS

French Preliminary Search Report.

* cited by examiner

*Primary Examiner*—Hwei-Siu Payer
(74) *Attorney, Agent, or Firm*—Abelman, Frayne & Schwab

(57) ABSTRACT

A suction connection arrangement for a compass saw includes a suction connection element (26) for connecting suction flow producing apparatus with the compass saw, a suction channel (24) for connecting the suction cross-section (18) of the saw with the suction connection element and completely separable from the compass saw (2), and a connection device (30) for releasably connecting the suction connection elements (26) with the saw housing (4).

1 Claim, 3 Drawing Sheets

COMPASS SAW WITH A SUCTION CONNECTION ARRANGEMENT

BACKGROUND OF THE INVENTION

1. Field of Invention

The present invention relates to a suction connection arrangement for a compass saw having a suction cross-section for aspirating a removable material from an operational region of the compass saw, with the suction connection arrangement including suction connection means for connecting suction flow producing means with the compass saw and suction channel means for connecting the suction cross-section with the suction connection means and separable from the compass saw.

2. Description of the Prior Art

Suction connection means or elements, which are mentioned above, are used for connecting a suction flow generator such as a dust suction module mountable on a compass saw, or for attaching a hose that would connect the saw with a vacuum cleaner standing on the ground. During an operation, the sawdust and chips can be aspirated from the operational region of the saw through the inlet opening, suction channel means, and the suction connection means or element into the suction hose or the dust suction module.

U.S. Pat. No. 5,778,538 discloses suction connection means for a compass saw and the suction connection element of which is formed as a connection tube fixedly secured to the saw housing. With its saw side opening, a removable suction tube can be inserted so that its free end is located adjacent to the saw blade. To the other end of the connection tube, a hose of a vacuum cleaner can be attached. Upon actuation of the vacuum cleaner, air is aspirated from the operational region through the inserted suction tube and the connection tube into the vacuum cleaner hose.

The drawback of the known suction connection means consists in that the suction connection means forms part of a compass saw even when no dust suction is necessary, which makes handling of the saw somewhat inconvenient. In addition, the connection tube makes the total appearance of the compass saw rather unwieldy, in particular, when the suction tube is removed.

Accordingly, an object of the present invention is suction connection means with which the above-discussed drawbacks are eliminated and which can be removed when dust suction is unnecessary.

SUMMARY OF THE INVENTION

This and other objects of the present invention, which will become more apparent further below, are achieved by providing suction channel means that are completely removable from the compass saw, and suction connection means that are releasably connected with the saw housing. With completely removable suction channel means and removable connection means, it is possible to remove all of the elements of a suction connection arrangement that project from the compass saw. When no dust suction is necessary, the compass saw would have a compact form which is easy to handle and, at the same time, would have a good appearance.

Advantageously, the suction channel means has a suction end insertable into a support receptacle fixedly secured in the saw housing and opening toward the operational region of the compass saw. The provision in a compass saw of a support receptacle for receiving the suction channel means provides for a particularly stable support of the suction channel means. In addition, with the suction channel means being received in the support receptacle and with the suction connection means being completely supported on the saw housing, the inconvenience, which is caused by pivotable relative to the housing guide blocks, is eliminated.

Advantageously, the suction end of the suction channel means has a substantially triangular outer cross-section corresponding to a substantially triangular cross-section of the support receptacle. The triangular, Δ-shaped, profile of the suction end of the suction channel means and of the support receptacle provides for an easy insertion of the suction channel means into the support receptacle.

According to a particularly preferred embodiment of the suction connection arrangement, the suction channel means and the suction connection means are formed on an adapter union integrally therewith. The provision of the suction channel means and of the suction connection means on the adapter union permits to remove elements of the suction connection arrangement, which project from the saw, quickly and easily from the saw in case no dust suction is necessary.

Advantageously, the adapter union has at least one flexible locking element engageable with matching locking means provided on the compass saw upon the adapter union being pressed against the saw housing. The locking connection of the adapter union with the saw housing insures a simple stable connection of the adapter union with the housing and its easy removal therefrom.

Advantageously, the locking element of the adapter union and the matching locking means provided on the saw form parts of a dovetail connection, which permits to establish or release the locking connection of the adapter union with the saw housing in a particularly simple manner. Alternatively, the flexible locking element can be pushed into the matching locking means.

Advantageously, the adapter union has a clamping ridge projecting therefrom and engaging from beneath, upon insertion of the adapter union in the saw housing in an operational direction, an inclination section provided in the saw housing. By providing the adapter union with a clamping ridge, a reliable attachment of the suction connection means with the saw housing is insured even when a tension load is applied thereto by the attached hose. This is because the clamping ridge of the adapter union is supported against the housing in the direction the tension load acts on the adapter union.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE REFERRED EMBODIMENTS

Figure 1:
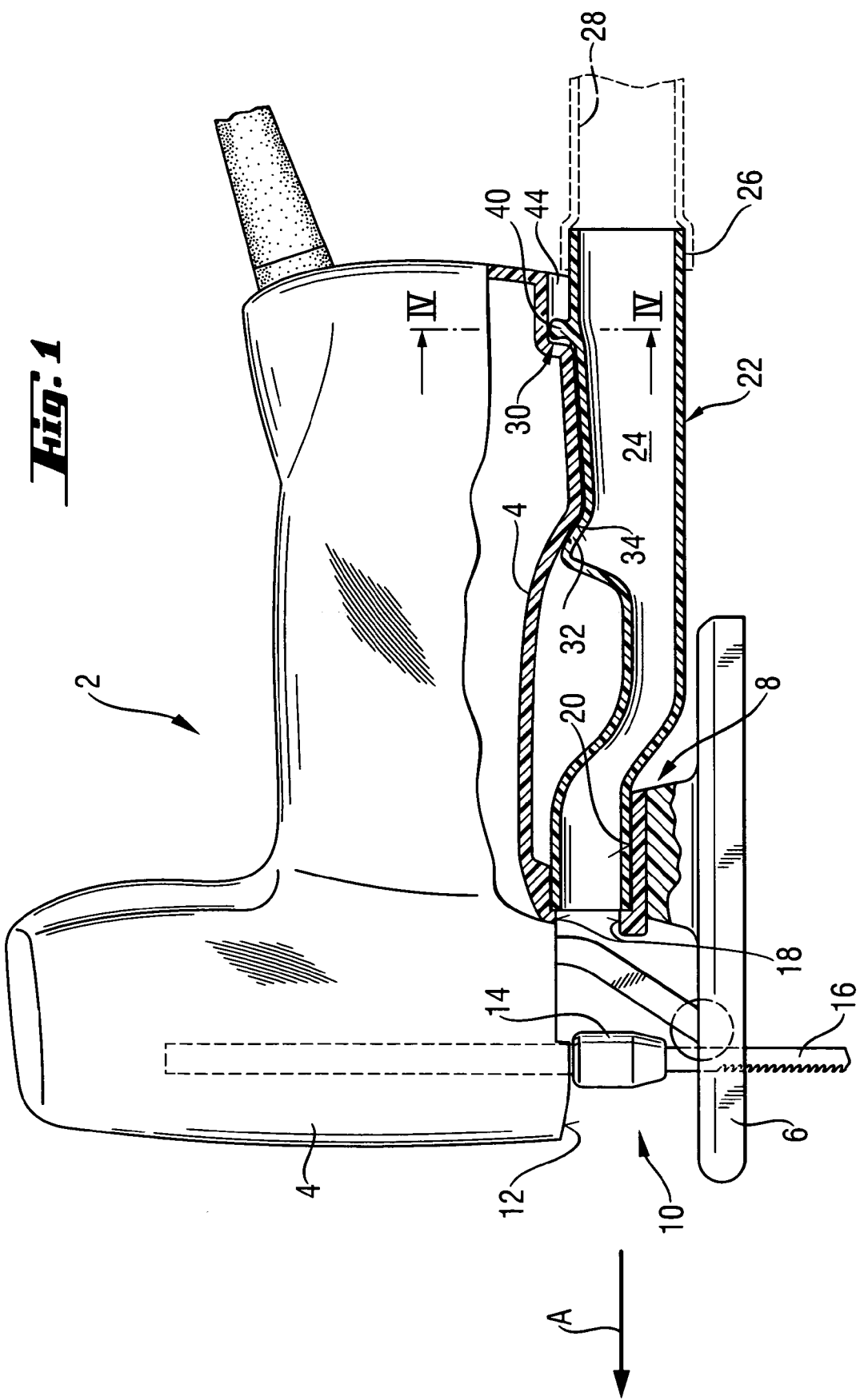
FIG. 1 a side view with a longitudinal cut-out of a compass saw with a suction connection arrangement according to the present invention.

FIG. 1 shows a compass saw 2 having a housing 4 with a support 8 on which a guide shoe 6 is supported. On a side of the support 8 facing in an operational direction A, there is provided, between the guide shoe 6 and the bottom 12 of the housing 4, an operational region 10. In the operational region 10, there is provided a tool support 14 in which a saw blade 16 is secured.

On the support 8, there is provided a suction cross-section 18 that opens, in the operational direction A, in the operational region 10. In the direction opposite the operational direction A, the suction cross-section 18 opens into a support receptacle 20. In the support receptacle 20, an adapter union 22 is inserted from the rear of the compass saw 2 in the operational direction A.

The adapter union 22 includes a suction channel 24 and a suction connection element 26 in form of a connector sleeve. In the embodiment shown in FIG. 1, both the suction channel 24 and the suction connection element 26 are formed as an integral part. Alternatively, the suction channel 24 can be formed of a plurality of channel elements connected with each other, with the suction connection element 26 being provided on one of the channel elements or being formed separately.

A suction hose 28, which is shown with dash lines, of a dust suctioning device (not shown) is connected to the suction connection element 26. The dust suction device can be formed by an industrial vacuum cleaner or vacuum suction module supported on the compass saw 2.

For a releasable connection of the adapter union 22 with the housing 4, there is provided, in addition to the support opening 20 of the support 8, locking connection means 30. Further, on the adapter union 22, a clamping ridge 32 is formed which is supported on an inclined section 34 of the housing 4 which is inclined in a direction opposite the operational direction A. As result, relative large tension forces can act on the adapter union 22 in the direction opposite the operational direction A, without breaking inadvertently the connection of the adapter union 22 with the compass saw 2.

Figure 2:
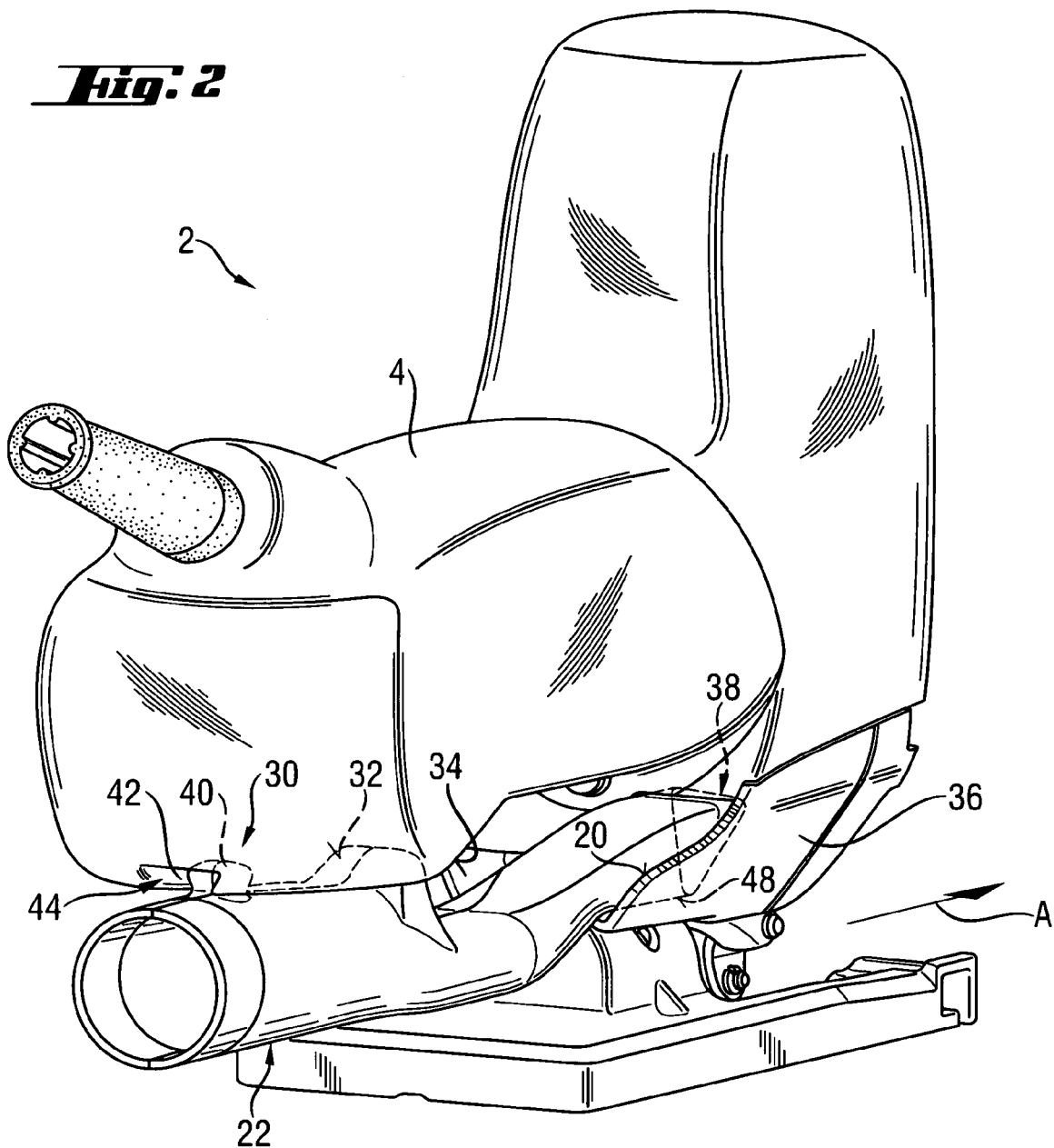
FIG. 2 a perspective rear view of the compass saw shown in FIG. 1.

As shown in FIG. 2, the support receptacle 20 is formed partially by a screen-shaped support element 36 supported on the housing 4. The support element 36 extends from the housing 4 at an acute angle upward, whereby the receptacle 20 has a Δ-shape. A suction end 38 of the adapter union 22, which likewise has a triangular cross-section, extends into the triangular receptacle 20, as can be clearly seen in FIG. 3.

Figure 3:
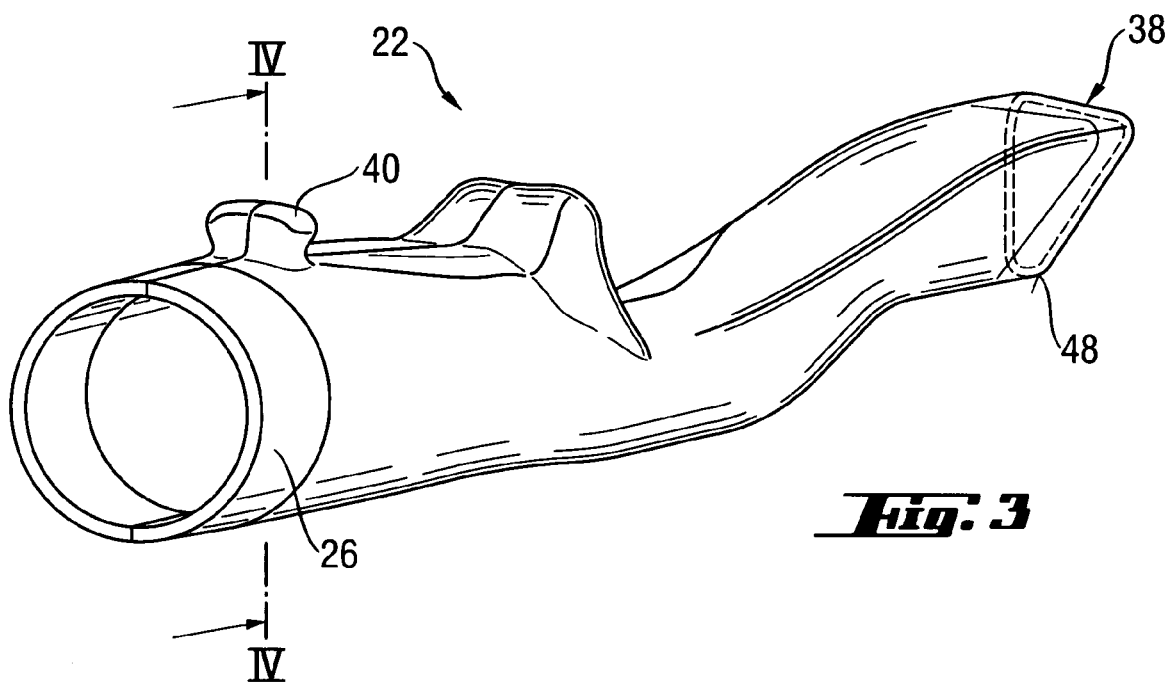
FIG. 3 a perspective view of suction channel means of the suction connection arrangement.

As shown in FIG. 3, the adapter union 22 has flexible locking means 40 which projects from its surface and forms part of the locking connection means 30. As shown in FIG. 2, the flexible locking means 40 engages in matching locking means 42 that is formed by a dovetail-shape recess formed in the housing 4. The formation of the matching locking means 42 as a dovetail-shaped recess permits, on one hand, to effect locking by pressing the adapter union 22 against the housing 4. On the other hand, it is also possible to insert the locking means 40 through the opening 44 of the dovetail-shaped matching locking means 42.

Figure 4:
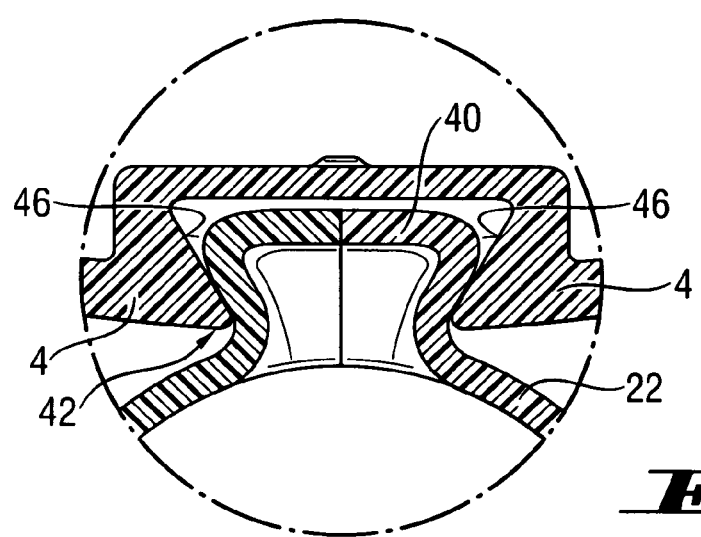
FIG. 4 a detailed cross-sectional view along line IV—IV in FIGS. 1 and 3 through locking connection means for connecting the suction connection arrangement with the saw housing.

As shown in FIG. 4, in both cases the flexible locking element 40 engages two, tapering toward each other, bearing surfaces 46 of the matching locking means 42, insuring a stable connection between the adapter union 22 and the housing 4.

For connecting the adapter union 22 with the compass saw 2, it is inserted in the support receptacle 20 in the operational direction A with its suction end 38. When the adapter union 22 is being inserted in the support receptacle 20, it is inserted with the sharp or acute edge 48 of the triangular end 38 in the sharp or acute region of the shield-shaped support element 36. In this way, an easy and self-centering insertion of the adapter union 22 in the support receptacle 20 is possible.

As soon as the adapter union 22 is completely inserted, it is pressed toward the bottom of the housing 4. In this way, the flexible locking element 40 is brought into the matching locking means 42 in order to form the above-described locking connection 30. In this position of the adapter union 22, the clamping ridge 32 abuts the inclined section 34 of the housing 4.

Alternatively to pressing the locking element 40, it can be inserted into the matching locking means 42 through the inlet opening 44. In this case, the adapter union 22 has a certain flexibility along its entire longitudinal extent. This is necessary in order to ensure that the adapter union 22, after being inserted with its suction end 38 in the support receptacle 20, can be bent sufficiently to effect insertion of the locking element 40 in the inlet opening 44. The bending ability is necessary because the clamping ridge does not yet abut the inclined section 34 but lies on a flat horizontal surface of the bottom of the housing 4. As soon as the adapter union 22 is completely inserted in the support receptacle 20, the clamping ridge 32 snaps beneath the inclined section 34 due to the flexibility of the adapter unit 22.

Finally, the vacuum apparatus can be directly mounted on the saw 2 or be connected to the suction connection element 26 of the adapter union 22 with a suction hose 28.

In case no dust suction is desired during the operation of the saw 2, the adapter union 22 and thus, the suction channel arrangement 24 and the suction connection element 26 can be disengaged from the housing 4. This insures a compact shape of the compass saw 2 and a corresponding positive appearance.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A suction connection arrangement for a compass saw (2) having a suction cross-section (18) for aspirating a removable material from an operational region (10) of the compass saw (2), the suction connection arrangement comprising suction connection means (26) for connecting suction flow producing means with the compass saw; suction channel means (24) for connecting the suction cross-section (18) with the suction connection means (26) and completely separable from the compass saw (2); and connection means (30) for releasably connecting the suction connection means (26) with a saw housing (4), wherein both the suction channel means (24) and the suction connection means (26) are provided on an adapter union (22), forming a one-piece part therewith, and wherein the adapter union (22) has a clamping ridge (32) projecting therefrom and engaging from beneath, upon insertion of the adapter union (22) in the saw housing (4) in an operational direction (A), an inclination section (34) provided in the saw housing (4).

* * * * *